Nov. 9, 1954  G. C. SKINNER  2,694,029
METHOD OF MAKING LAMINATED MATERIAL
Filed July 7, 1951

Inventor
Garnett C. Skinner

United States Patent Office 2,694,029
Patented Nov. 9, 1954

2,694,029

METHOD OF MAKING LAMINATED MATERIAL

Garnett C. Skinner, Chicago, Ill., assignor to The Scholl Mfg. Co., Inc., Chicago, Ill., a corporation of New York Application July 7, 1951, Serial No. 235,657

4 Claims. (Cl. 154—139)

This invention relates to improvements in a laminated material, and more particularly to a laminated material highly desirable for use on the palmate side of a glove to provide a positive gripping surface on the glove, and to a new and novel method of making the laminated material, although the invention may have other uses and purposes as will be apparent to one skilled in the art.

Frequently a glove or the like having a palmate face that enhances the gripping power of the glove, but yet which feels the same to the hand as the glove without such face, is highly desirable. This is especially true when it is necessary to handle smooth surfaced articles, especially those made of glass, plastic, metal, and the like; such, for example, as the steering wheel of an automobile, or when lifting heavy but smooth surfaced articles. Accidents have frequently happened by heavy smooth surfaced articles, such as a shell or a heavy pipe, slipping from the hand of an operator and crushing a foot.

With these thoughts in mind, it is an important object of the instant invention to provide a laminated material, highly suitable for use on the palmate side of a glove, and which material has an external gripping face of a non-skid character, yet the whole laminated structure is highly durable and very flexible.

Another object of the invention is the provision of a laminated material embodying a fabric with a layer of foam latex on one side impregnated in the fabric.

Also a feature of the invention resides in the provision of a laminated fabric having one face of foam latex of fine durable texture, which does not interfere with the flexibility of the backing layer of other substance, and which provides an excellent gripping surface.

It is also an object of this invention to provide a new and novel method of making a laminated material having a gripping surface on one side.

A further object resides in the provision of a method of making a laminated material including the steps of securing together a backing layer and a layer of foam latex, and then removing the outer portion of the foam latex layer leaving the remainder to function as a gripping surface on the laminated material.

Also an object of this invention is the provision of a method of making a laminated material, embodying the steps of joining a sheet of foam latex to a sheet of fabric in such a manner that the latex impregnates the fabric part way therethrough, and then peeling, rubbing, or otherwise frictionally removing the outer portion of the latex layer to a point where no more of the layer will readily separate from the fabric.

It is also an object of this invention to provide a glove or the like having a palmate gripping face embodied in a laminated material made under the method herein set forth.

While some of the more salient features, characteristics and advantages of the instant invention have been above pointed out, others will become apparent from the following disclosures, taken in conjunction with the accompanying drawing, in which—

It will be understood that the backing layer of the laminated material embodied in this invention may be of various different substances of a flexible character and which may be suitable for use in a glove. However, the preferable material is a fabric, and a cloth fabric has been selected to illustrate the invention. Secured to a face of this fabric layer 1 is an outer layer 2 which is preferably of cellular rubber-like material. This layer 2 may be of synthetic foam latex or natural foam latex.

As used in the instant invention, foam latex, either synthetic or natural, must be distinguished from sponge rubber. It is well known that sponge rubber may be made by mixing a gasifying material with the rubber, and wherein the pores in the rubber are produced by the evolution of gases generated within the body of the sponge rubber. As a result, sponge rubber contains a large number of pores or cells which are substantially individual in character and do not communicate with each other. On the other hand, with foam latex the cells are produced by a whipping process, and the cells are intercommunicative. Consequently, foam latex is of a lighter and softer texture than sponge rubber. As used in the instant invention, foam latex is entirely satisfactory, while sponge rubber is too tough to be used in the practice of my process.

While the two sheets 1 and 2 may be cemented together and a satisfactory product produced, it is preferable to vulcanize the sheet of foam latex to the fabric sheet. This results in an impregnation of the fabric layer by the foam latex layer, and this impregnation is preferably substantially half way through the fabric layer, all as clearly illustrated in Fig. 2.

It is preferable not to have the foam latex impregnate or permeate the fabric entirely therethrough, so that the opposite face of the fabric will be in its original state and possess its original feel.

Figure 1:
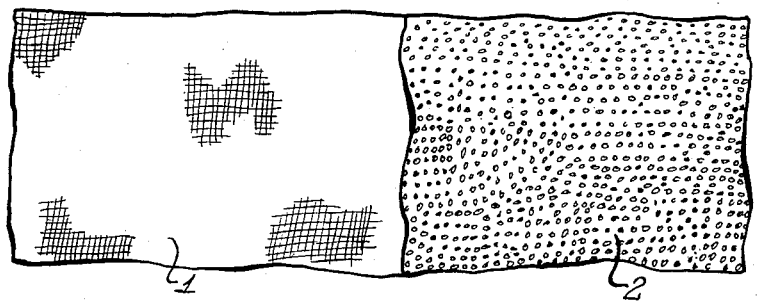
Figure 1 is a fragmentary plan view, with a part broken away, illustrating an initial step in the process of making the laminated material.
Figure 2:
Figure 2 is a greatly magnified vertical sectional view through the structure of Fig. 1, but illustrating a further step in the process.

After the two layers have been joined together, by the application of friction or in any other suitable manner, the outer part of the foam latex layer is peeled or rubbed off as indicated at 3 in Fig. 2. Up to a certain depth, the foam latex will respond rather readily to a frictional application and peel or rub off, but beyond that depth the foam latex will not respond to such friction and will not peel or rub off. In the practice of the invention, there is no difficulty in determining how much foam latex should be removed, since the property of the latex itself after being bonded with the fabric will at once and plainly determine the division line.

With the rubbing off of the outer portion of the latex layer, a fine, porous, and very durable latex covering remains on the fabric, and this covering will provide a desirably adhesive gripping surface when such laminated material is utilized in a glove or the like. This fine, but porous surfaced coating of latex is indicated at 4 in Figs. 2 and 3.

Figure 3:
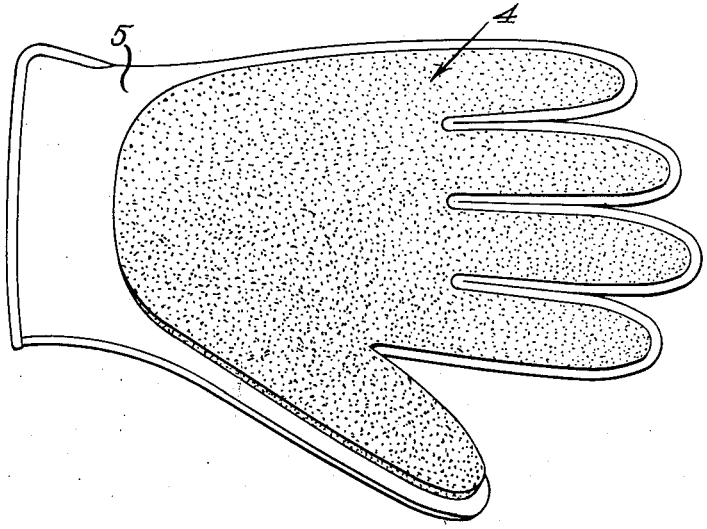
Figure 3 is a plan view of a glove in which the laminated material is embodied on the palmate side.

In Fig. 3 I have illustrated a common form of glove 5 having the laminated material above described on the palmate side of the glove. This material by virtue of the fact that the latex does not permeate entirely through the fabric, may be used as the entire palmate glove piece so the hand of the user actually contacts the inside face or naked face of the fabric, the latex face of course being exposed as indicated. On the other hand, the laminated material may be readily attached as by cementing, stitching, or otherwise, to the palmate face of a finished glove, the backing layer 1 of fabric or other material providing a surface that is easily bonded to the palmate glove piece.

From the foregoing, it is apparent that I have provided a novel laminated material having a gripping surface on one side thereof, and an extremely economical method of producing that material, the resultant structure being highly suitable for use on the palmate side of a glove or the like, being highly durable, and retaining its gripping characteristics indefinitely.

It will be understood that modifications and variations

I claim as my invention:

1. The method of making a laminated material, including the steps of securing a sheet of foam latex to a sheet of fabric, and lightly abrading the outer portion of the latex sheet to peel and rub off the outer portion of the latex sheet to form a gripping surface and prevent further peeling of the latex sheet when the laminated material is in use.

2. The method of making a laminated material for use on the palmate side of a glove to provide a gripping surface, including vulcanizing a sheet of foam latex to a sheet of fabric to an extent that the fabric sheet is impregnated substantially half way through with the latex, and then lightly abrading the outer portion of the latex sheet to prevent further peeling and leave a gripping surface on the laminated material.

3. The method of making a laminated material for use on the palmate side of a glove to provide a gripping surface, including vulcanizing a sheet of foam latex to a sheet of fabric to an extent that the fabric sheet is impregnated substantially half way through with the latex, and then lightly abrading the outer portion of the latex sheet to remove substantially the outer half of the latex sheet leaving the thin remainder attached to the fabric to provide a gripping surface.

4. The method of making a laminated material, including the steps of securing a sheet of foam latex over and to a sheet of other material, and then removing a surface portion of the latex sheet.

References Cited in the file of this patent

UNITED STATES PATENTS

| Number | Name | Date |
|---|---|---|
| 1,179,871 | St. John | Apr. 18, 1916 |
| 1,696,129 | Silver | Dec. 18, 1928 |
| 1,777,945 | Untiedt | Oct. 7, 1930 |
| 1,845,688 | Untiedt | Feb. 16, 1932 |
| 1,941,053 | Raepsaet | Dec. 26, 1933 |
| 1,979,130 | Wiley | Oct. 30, 1934 |
| 2,071,647 | Miller | Feb. 23, 1937 |
| 2,383,734 | Pfleumer | Aug. 28, 1945 |
| 2,563,478 | Mason et al. | Aug. 7, 1951 |
| 2,579,545 | Cadous | Dec. 25, 1951 |

FOREIGN PATENTS

| Number | Country | Date |
|---|---|---|
| 406,697 | Great Britain | Feb. 26, 1934 |
| 476,205 | Great Britain | Dec. 3, 1937 |
| 502,733 | Great Britain | Mar. 24, 1939 |